United States Patent [19]
Correll et al.

[11] Patent Number: 5,094,026
[45] Date of Patent: Mar. 10, 1992

[54] TROLLING SQUID LURE

[76] Inventors: Robert P. Correll, P.O. Box 57 Benedict Ave., Benedict, Md. 20612; Joseph H. Gribble, 13109 River Ter., Lusby, Md. 20657

[21] Appl. No.: 682,363

[22] Filed: Apr. 9, 1991

[51] Int. Cl.$^5$ .............................................. A01K 85/00
[52] U.S. Cl. .................... 43/42.28; 43/42.11; 43/42.15
[58] Field of Search ................ 43/42.28, 42.1, 42.11, 43/42.12, 42.15, 42.39, 42.29

[56] References Cited

U.S. PATENT DOCUMENTS

| | | | |
|---|---|---|---|
| 2,590,461 | 3/1952 | Rasch | 43/42.28 |
| 2,617,226 | 11/1952 | Yoshii | 43/42.28 |
| 2,932,916 | 4/1960 | Strickland | 43/42.28 |
| 3,230,656 | 7/1976 | Husson, Jr. | 43/42.28 |
| 3,567,782 | 10/1989 | Gudermuth, Jr. | 43/42.15 |

Primary Examiner—Richard K. Seidel
Assistant Examiner—Chuck Y. Mah
Attorney, Agent, or Firm—Richard C. Litman

[57] ABSTRACT

A fishing lure has the shape of a squid. The lure comprises two sections: the rear body section which resembles the tapered rear part of a squid and the rounded front section or head which includes eyes and a fringed skirt resembling the squid's tentacles. The body and the head may be molded of rubber or plastic, and may be in the form of a hollow sheath. The rear and front parts are joined by a hinge which allows swiveling motion. The body and head are both radially symmetrical and each includes an internal weight. The body includes a central metal rod. The rod protrudes from the conical tip of the body and terminates in an eye loop where a fishing line is tied. The front end of the rod connects to the hinge, which may be simply two interhooked wire loops. The head has eye bulges and includes a second internal weight which is fixed directly to the hinge. A hook is mounted on the other side of the head weight. The hook is disposed within the tenacles. The rounded rear part of the head fits partially within a hollow on the forward end of the body; the hinge in hidden within.

10 Claims, 1 Drawing Sheet

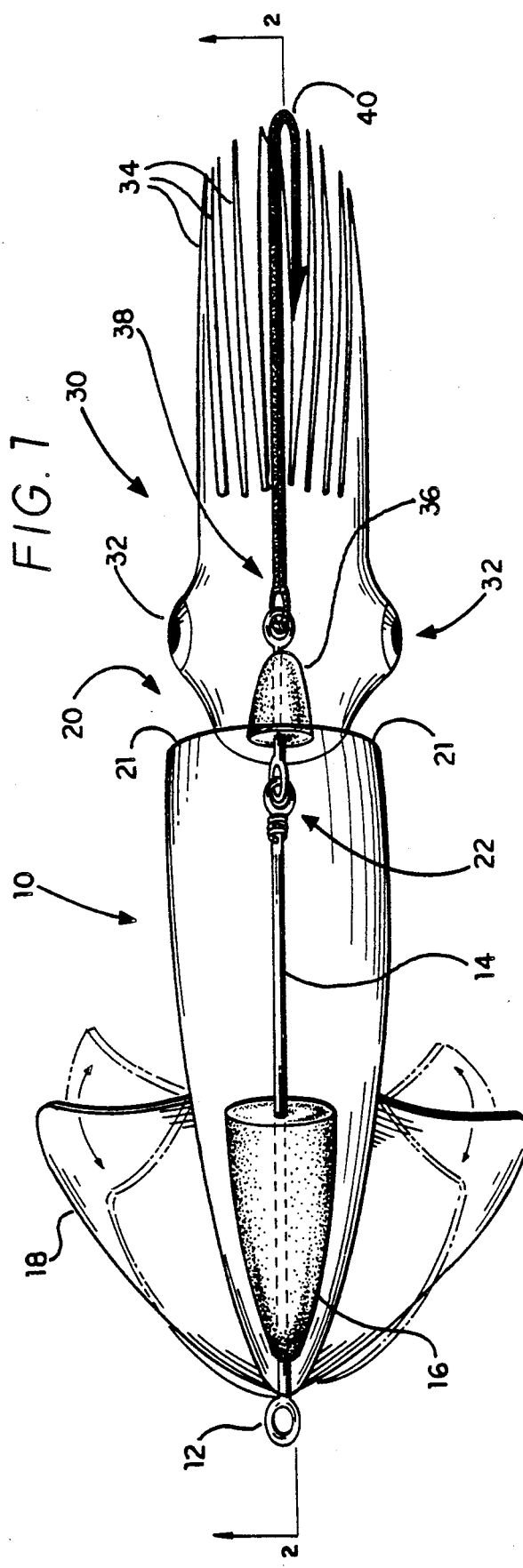
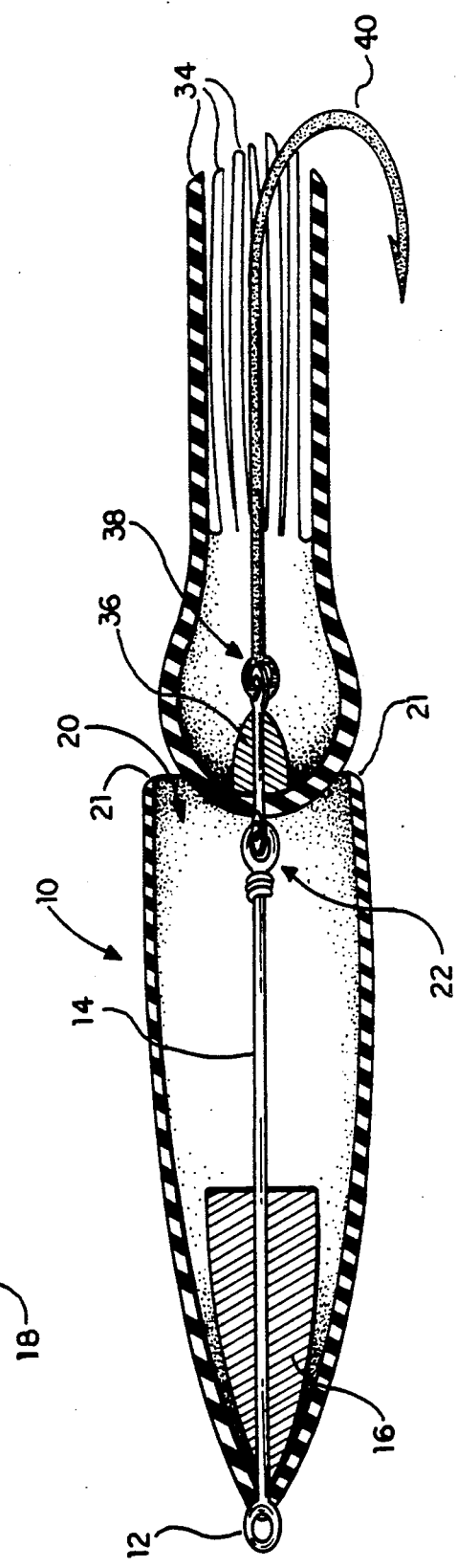

TROLLING SQUID LURE

FIELD OF THE INVENTION

The present invention relates to fishing lures which resemble squid.

DESCRIPTION OF THE PRIOR ART

Certain fish eat squid, and so fishing lures in the shape of squid have been used by people fishing for those squid-eating fish.

One such lure is shown in U.S. Pat. No. Des. 258,833 issued to Yano. Yano's fishing jig comprises a rubbery sheath formed to imitate a squid. the sheath membrane forms a hollow closed tube of generally circular cross sections. The diameter increases from small at the rear end or body of the squid, to a short cylindrical region, and then flares out into a skirt. The skirt is cut into ribbons or fringes imitative of the squid's tentacles. A diamond-shaped winglet is surface-mounted on top of the rear cone body region. The winglet is imitative of the squid's fins. The jig includes eye and skin texture indicia.

A fishing lure resembling a squid, to be described below, was bought by Applicant Correll on a trip overseas about thirty years ago. Applicant does not recall if the purchase was made in the United States or overseas. Applicant bought the one lure which was displayed at the place of sale, leaving no others for sale. To the Applicants' best knowledge, it is likely that these lures have never been known or used by others in the United States. In Applicants' extensive experience with fishing and fishermen they have not encountered another in the United States. The purchased lure has been modified by Applicants into the present invention.

The purchased lure comprises two sections resembling the rear body-like portion, and front head/tentacles portion, of a squid.

The rear section contains a central steel rod or heavy wire, which provides strength. The remainder of the body, surrounding the rod, is a tough rubber sheath: the wall thickness is about an eighth of an inch. The outer shape is like that of the body of a squid: a symmetrical, smoothly curved but pointed form like the nose of a supersonic aircraft. The sheath ends in an open end or hem at the front.

The front is a similar rubber sheath, which is less pointed. The rearmost end is rounded into a spherical shape, which merges smoothly into a cylinder toward the tentacles. Two bumps, imitative of the squid's eyes, are molded into the surface where the sphere meets the cylinder. The front end of the cylinder part of the sheath is open, like the rear sheath. The greater part of the length of the cylindrical part is cut into fringes, imitative of the tentacles of the squid.

The rod connects to a small lead weight inside the sheath that forms the head. The rod connection is by means of a bent loop on the front end of the rod and an interlocked wire loop extending from the weight. A hook is fastened to a front end of the weight. The hook has a sharpened point and barb. It is disposed within the trailing tentacles.

In the purchased lure there is a substantial gap between the sheaths of the two sections. The gap is about equal to the diameter of the sheaths.

The rear rod does not extend axially all the way through the rear sheath. Adjacent the rear tip, the rod bends downward and penetrates a metal ballast plate which is securely fastened to the lower inside surface, by being molded into the rubber of the sheath. The rear rod continues through the sheath and then doubles back into the plate to form a closed loop. This loop is the attachment point for the fishing line. (The lure is towed "backward", with the head and tentacles trailing.)

The ballast plate of the purchased lure flattens the underside of the rear end of the lure body, which makes the shape more realistic. The rear tip of the body is not pointed but rather flattened. But the asymmetrical shape encourages corkscrew motions, and the underneath placement of the trolling line tends to make the lure swim upward to the surface.

The purchased lure suffers from the drawback that the large gap between the rear and front sections is unrealistic, and the rounded end of the head section is liable to oscillate relative to the hem or cut-off end of the rear body section. As mentioned above, the placement of the loop causes the lure to be hydrodynamically unstable, since the trolling force of the fishing line is offset from the axis of the lure. Moreover, the off-center placement of the rear weight also tends to destabilize the lure. As a result of these design defects the lure is liable to move erratically.

In addition, the rear fins of the lure are quite stiff and so are likely to set up oscillatory vortexes in the water.

The prior art does not disclose a two-part squid-like lure which includes a central towing point, a symmetrical body, a narrow gap between the two parts to imitate a real squid, and non-rigid fins.

Accordingly, one object of the present invention is an improved two-part squidlike lure which is radially symmetrical for stability in the water.

Another object is such a lure which includes flexible fins in the rear portion of the lure.

Another object is such a lure in which the gap between the rear and front parts is narrow.

These and other objects of the present invention will be readily apparent upon further review of the following specification and drawings.

SUMMARY OF THE INVENTION

The present invention is a fishing lure in the shape of a squid. The lure comprises two sections: the rear body section which resembles that streamlined body of a squid, and the front section or head which includes eyes and a fringed skirt resembling the squid's tentacles. The body and the head may be molded or rubber or plastic, and may be in the form of a hollow sheath. The rear and front parts are joined by a hinge which allows relative angular motion. The body is radially symmetrical and includes a central metal rod. The rod protrudes from the conical tip of the body and terminates in an eye for tying on a fishing line. The front end of the rod connects to the hinge, which may be two interhooked eyes. The head is rounded and includes a second internal weight which is fixed directly to the hinge. A hook is mounted on the other side of the head weight. The hook is disposed within the tentacles.

BRIEF DESCRIPTION OF THE DRAWINGS

FIG. 1 is an elevation view of the lure.

FIG. 2 is a cross sectional plan view of the lure of FIG. 1.

Similar reference characters denote corresponding features consistently throughout the attached drawings.

DETAILED DESCRIPTION OF THE PREFERRED EMBODIMENT

The squid lure of the present invention is shown in FIG. 1. The lure comprises two parts or sections: a rear body section 10, on the left in the drawing figures, and a front head section 30. The lure may be of any size, but typically will be from 10 to 20 inches long.

The body and head are molded from soem appropriate material. The material must be tough, and preferably is flexible. The material may be colored to match a living squid. The body and head can be molded as solid bodies, or may be hollow sheaths with a thin, generally constant thickness. The embodiment with sheath construction is shown in the cross sectional view of FIG. 2, which is taken along section line 2—2 of FIG. 1.

If sheath construction is used, the lure may be heat molded from sheet stock.

Both the body 10 and the head 30 are, generally, radially symmetrical. They are joined along their respective axes to form a radially symmetrical complete whole (that is when the axes are aligned).

The body 10 includes two fins 18, and the head 30 includes two eyes bumps 32. These structure are disposed on either side of the lure 180 degrees one from the other.

The body 10 includes a strengthening and stiffening rod 14 which runs along the axis of the body. The rod is preferably made of steel wire of gauge 12 or gauge 15. The rear end of the rod 14 is bent into a loop or eye 12 for tying on a fishing line for towing the lure through the water when trolling. Other means for attaching the fishing line may be substituted for the eye shown.

The front end of the rod 14 includes another eye loop which is interhooked with a third eye loop to form hinge 22. The hinge 22 allows the body 10 and head 30 of the lure to swivel. This encourages slight swimming motions and makes the lure more realistic. The form of hinge shown, interhooked eye loops, is preferred because it allows swiveling and also relative rotation, but the rotation is limited to moderate angles. It is also inexpensive and simple to fabricate.

Inside the rear of the body 10 is a body weight 16. This weight is preferably symmetrical and surrounds the rod 14. It may be shaped to fit the inside of the sheath of the body 10. It may also be molded inside the body 10 if the body is solid. The mass is about ½ oz.

The two fins 18, modeled on the fins of a squid, are disposed on either side of the body 10. If the material from which the body 10 is molded is flexible, these fins wil execute fluttering or flapping motions as the water flows over them. This helps to stabilize the lure.

The body 10, even if molded as a solid body rather than as a sheath, includes a hollow space or concavity 20 at the front, which is surrounded by a rim 21. The rounded forward end of the head 30 fits into the space 20 and, seen from the side, is partially covered by the rim 21. This insertion makes the lure more realistic, since a real squid does not have a separation between the body and head, as was found in the prior art.

The head 30 preferably includes bumps or bulges 32 resembling eyes, and eye indicia, for realism. The indicia may be molded in or painted on, or both. A second weight 36 is disposed within the rear or forward part of the head 30 proximal the body 10. The head 30 is, like the body 10, preferably made as a sheath, but may also be solid at the forward part; the weight 36 may then be embedded.

The preferred form of hinge 22 (interhooked eye loops) allows the fins 18 to be angularly aligned with the eye bulges 32. Such a hinge has a single angular alignment which is tends toward; it resists angles which are far removed from that angle. In the case of the present invention, where the fins and eye bulges must be aligned roughly as shown in the drawing if the lure is to look at all realistic, this form of hinge is very effective in maintaining the correct relative orientation of the body 10 and head 30.

A hook 40 is attached to the front end of the weight 36, preferably by the same interhooking loop structure as is used in the hinge 22. If the weight is of a soft metal like lead, then a wire or rod of steel, running through the weight 36, may be needed for strength. The hook might be from 8/0 to 14/0 size.

Tentacles 34 extend from a circular region on the head 30. In the case of sheath construction, the tentacles are conveniently made by slitting the sheath. The tentacles may also be individually molded if the lure is injection molded. The tentacles should be flexible to wiggle in the water stream.

The present invention is not limited to the specific embodiments described above, but encompasses all lures within the scope of the following claims.

We claim:

1. A fishing lure resembling a squid, said lure comprising:
   a body having a rear body end and a front body end, said body including
      a tapered tip at said rear body end, said tip including fishing line attachment means,
      an open hollow space at said front body end,
      a generally circular rim surrounding said hollow space,
      a central rod fixed to said attachment means, said rod extending longitudinally through said body into said hollow space to a hinge, said hinge disposed within said hollow space,
      a body weight within said body adjacent said rear body end, said weight surrounding said rod, and
      two fins extending from said rear body end adjacent said tip;
   a rounded head including
      a head read end and a head front end,
      a head weight disposed within said head,
      means for attaching said head rear end to said hinge, and
      tentacles extending from said head front end, said tentacles attached to said head in a generally circular pattern; and
   a hook pivotally attached to said head weight; and wherein
      said head rear end is disposed partially within said hollow space of said body; whereby
      said lure exhibits the appeerence of a single jointed object and resemles a squid in appearance and motion.

2. A lure as in claim 1, wherein
   said fins are flexible, whereby said fins flutter as said lure is trolled through the water.

3. A lure as in claim 1, wherein
   said body and said head are radially symmetrical,
   said fishing line attachment means, said rod, and said hinge lie on a body axis of said body, and
   said hinge lies on a head axis of saide head, 4. A lure as in claim 3, wherein
   said tapered tip is generally conical.

5. A lure as in claim 3, wherein
said fins lie in a plane, and said body axis lies within said plane.

6. A lure as in claim 5, including
two eye bulges on either side of said head, said bulges including eye indicia, and wherein
said eye bulges are disposed symmetrically on either side of said head.

7. A lure as in claim 6, wherein said hinge comprises two interhooked wire loops, and said fins and said eye bulges are angularly aligned when said loops are interhooked at right angles, whereby said fins and said eye bulges tend to be aligned in a lifelike manner.

8. A lure as in claim 1, including
two eye bulges on either side of said head.

9. A lure as in claim 8, wherein siad bulges including eye indicia.

10. A lure as in claim 1, wherein said hinge comprises two interhooked wire loops.

* * * * *